(12) United States Patent
Park

(10) Patent No.: US 7,450,750 B2
(45) Date of Patent: Nov. 11, 2008

(54) METHOD AND SYSTEM FOR CHROMA KEY MASKING

(75) Inventor: Geoffrey M. Park, Toronto (CA)

(73) Assignee: Sonic Solutions, Inc., Santa Clara, CA (US)

( * ) Notice: Subject to any disclaimer, the term of this patent is extended or adjusted under 35 U.S.C. 154(b) by 267 days.

(21) Appl. No.: 11/259,242

(22) Filed: Oct. 25, 2005

(65) Prior Publication Data

US 2006/0045332 A1 Mar. 2, 2006

Related U.S. Application Data

(62) Division of application No. 10/097,688, filed on Mar. 12, 2002, now Pat. No. 6,970,595.

(51) Int. Cl.
*G06K 9/00* (2006.01)
*H04N 1/46* (2006.01)

(52) U.S. Cl. .................................... 382/162

(58) Field of Classification Search ................ 382/162, 382/172, 283, 298; 358/517; 375/240.08, 375/240.24; 348/36, 140, 584, 587, 592
See application file for complete search history.

(56) References Cited

U.S. PATENT DOCUMENTS

| 6,300,955 | B1 * | 10/2001 | Zamir | 382/283 |
| 6,859,236 | B2 * | 2/2005 | Yui | 348/584 |
| 2006/0045332 | A1 * | 3/2006 | Park | 382/162 |

* cited by examiner

*Primary Examiner*—Amir Alavi
(74) *Attorney, Agent, or Firm*—Martine Penilla & Gencarella, LLP

(57) ABSTRACT

A method for chroma key masking is provided. The method includes adjusting a first parameter representing a size of a first ellipsoid in a color space, adjusting a second parameter representing a size of a second ellipsoid in the color space, and generating a mask value for a given pixel color based on the location of the given pixel color in the color space, relative to the first and second ellipsoids. The first ellipsoid is centered about a prescribed chroma key color and the second ellipsoid is also centered about the prescribed chroma key color. The second ellipsoid surrounds the first ellipsoid in the color space.

10 Claims, 2 Drawing Sheets

METHOD AND SYSTEM FOR CHROMA KEY MASKING

CROSS-REFERENCE TO RELATED APPLICATIONS

This application is Divisional a of U.S. patent application Ser. No. 10/097,688, filed on Mar. 12, 2002 now U.S. Pat. No. 6,970,595, from which priority under 35 U.S.C. § 120 is claimed. The disclosure of this application is incorporated herein by reference in its entirety.

BACKGROUND

The present invention relates generally to digital image processing, and specifically to mask generation.

DESCRIPTION OF THE RELATED ART

Digital color images are comprised of rectangular arrays of pixels, each pixel specifying a color. Generally, color is specified in terms of three color coordinates, such as coordinates within the familiar red-green-blue (RGB) color space. Thus a digital image of pixel dimension m×n has a representation as $\{\vec{p}_{ij}=(r_{ij}, g_{ij}, b_{ij}): 0 \leq i < m, 0 \leq j < n\}$. The color coordinates themselves are generally 8-bit numbers, although other color depths are often used. For 24-bit RGB color values, each of $r_{ij}$, $g_{ij}$ and $b_{ij}$ take values between 0 and 255 inclusive, with (0, 0, 0) being black (absence of color) and (255, 255, 255) being white.

An important operation in digital image compositing is masking, also referred to as silhouetting. Masking is the process of "cutting out" a desired subject from within a digital image. Visually, masking corresponds to cutting out a subject from a photograph with a scissors; for example, cutting out the part of a photograph containing one or more people. In the digital world, where images are always rectangular, the "cutting out" is generally performed by generating an appropriate digital mask.

A "digital mask," also referred to simply as a "mask," is a rectangular array of transparency values, generally ranging between 0 and 255 inclusive. A mask value of 0 corresponds to full opacity, a mask value of 255 corresponds to full transparency, and a mask value in between corresponds to partial transparency. A digital mask is superimposed upon a digital image of the same pixel dimensions in order to cut out the desired subject. Pixel locations where a digital mask is fully opaque are blocked out of the digital image. Thus opacity is used to block out portions that are not part of the desired subject. Similarly, colors of the digital image at pixel locations where a digital mask is fully transparent are retained. Mask values intermediate between 0 and 255 are used to fade between transparent and opaque areas of the digital image.

Numerically, masks are generally applied to digital images by multiplying color coordinates by a normalized mask value. Thus an m×n mask $\{\alpha_{ij}: 0 \leq i < m, 0 \leq j < n\}$ applied to an m×n digital image $\{(r_{ij}, g_{ij}, b_{ij}): 0 \leq i < m, 0 \leq j < n\}$ generally produces an m×n masked digital image $$\left\{\left(\frac{\alpha_{ij} r_{ij}}{255}, \frac{\alpha_{ij} g_{ij}}{255}, \frac{\alpha_{ij} b_{ij}}{255}\right): 0 \leq i < m, 0 \leq j < n\right\}.$$

Applications of digital masking include replacing a background in a digital image with a substitute background, and, more generally, compositing a desired subject with one or more additional image layers.

There are several approaches to mask generation. Some approaches require more manual work on the part of a user, and some require less or no manual work. A popular approach used currently to generate a mask is highlighting, where a user designates an approximate boundary around a desired subject using nodes and simple lines and curves, and a digital imaging software application automatically refines the boundary and generates a mask with values zero at pixel locations inside of the boundary and values 255 at pixel locations outside of the boundary. Highlighting programs often include a partially transparent zone between the inside and the outside of the boundary, so that the mask generates a smooth fade at the boundary of the desired subject.

Another popular approach is chroma keying. Use of a chroma key provides a more automated mask generation than does highlighting, at the cost of more manual work in preparation of the digital image. To prepare a digital image for chroma key processing, a subject is photographed against a homogeneous background, the color of which is referred to as a chroma key. Optimal colors for chroma keys are blues, since natural colors of human subjects tend to have low blue color components. For such images with homogenous backgrounds, automatic mask generation is generally performed by assigning opaque mask values to pixels with colors that match the chroma key, and transparent mask values to pixels with colors that do not match the chroma key.

A general reference on chroma keying is Jack, K., Video Demystified: A Handbook for the Digital Engineer, $2^{nd}$ Edition, HighText Publications, San Diego, 1995, pages 404-412.

Chroma key masking programs do not perform well with backgrounds that are not homogenous in color. Such programs tend to generate inaccurate masks, which include parts of a background with the desired foreground subject. In turn, when such programs try to compensate for heterogeneous background coloration, they tend to over-compensate and generate masks that block out parts of the desired foreground subject.

U.S. Pat. No. 6,201,581 to Moriwake et al. describes the use of concentric spheres in a color space centered about a chroma key color, for mask generation. However, for backgrounds with non-homogenous coloration, one does not obtain sufficiently good background/foreground discrimination using concentric spheres. Consider, for example, a background that is painted uniformly but lit unevenly. Expanding a sphere to include all such background pixels typically has the disadvantage of inadvertently also including pixels of quite different colors, thereby causing portions of the desired foreground subject to disappear.

Thus there is a need for a robust chroma key process that accurately masks out backgrounds with non-homogenous colorations.

SUMMARY

The present invention provides a robust method and system for mask generation based on a chroma key. The present invention is advantageous over prior art methods and systems in that it yields good background/foreground discrimination for backgrounds that are not professionally lit. In a preferred embodiment, the present invention uses only two user adjustable parameters.

The present invention uses two ellipsoids in color space centered about a chroma key color, for generating masks. For a given pixel color, the present invention preferably determines a mask value based on the location of the pixel color in color space, relative to the two ellipsoids. Sizes of the two ellipsoids are adjustable by a user.

The present invention is advantageous over the above mentioned U.S. Pat. No. 6,201,581 to Moriwake et al., in that use of concentric ellipsoids oriented along a chroma key color enables one to discriminate in a non-uniform way between brightness variation and hue variation when separating background colors from foreground colors. Specifically, using the present invention, one can generate a keyed region that includes pixel colors that differ from the chroma key color mainly in their brightness components.

There is thus provided in accordance with a preferred embodiment of the present invention a method for chroma key masking. The method includes adjusting a first parameter representing a size of a first ellipsoid in a color space, adjusting a second parameter representing a size of a second ellipsoid in the color space, and generating a mask value for a given pixel color based on the location of the given pixel color in the color space, relative to the first and second ellipsoids. The first ellipsoid is centered about a prescribed chroma key color and the second ellipsoid is centered about the prescribed chroma key color. The second ellipsoid surrounds the first ellipsoid in the color space.

There is further provided in accordance with a preferred embodiment of the present invention a chroma key masking system including a parameter controller adjusting first and second parameters representing sizes of a first and a second ellipsoid in a color space, respectively, the first and second ellipsoids being centered about a prescribed chroma key color, and the second ellipsoid surrounding the first ellipsoid in the color space, and a mask processor for generating a mask value corresponding to a given pixel color based on the location of the given pixel color in the color space, relative to the first and second ellipsoids.

There is yet further provided in accordance with a preferred embodiment of the present invention a method for chroma key masking including for a given pixel color, calculating a quadratic function of the pixel color coordinates based on a prescribed chroma key color, the quadratic function corresponding to an ellipsoid in a color space, generating a substantially transparent mask value for the given pixel color, if the quadratic function is less than a prescribed lower threshold, generating a substantially opaque mask value for the given pixel color, if the quadratic function is greater than a prescribed upper threshold, and generating a partially transparent mask value for the given pixel color, based on the value of the quadratic function, if the quadratic function is between the prescribed lower threshold and the prescribed upper threshold.

There is moreover provided in accordance with a preferred embodiment of the present invention a chroma key masking system including a mask generator for calculating a mask value corresponding to an input pixel color, based on a prescribed chroma key color, including a color processor calculating a quadratic function of the input pixel color coordinates, based on the prescribed chroma key color, the quadratic function corresponding to an ellipsoid in a color space, and a comparator comparing the value of the quadratic function to at least one prescribed threshold, a pixel array processor for extracting individual pixel colors from a digital image and transmitting them to the mask generator, and a digital mask processor for receiving individual mask values from the mask generator and incorporating them within a digital mask.

BRIEF DESCRIPTION OF THE DRAWINGS

The present invention will be more fully understood and appreciated from the following detailed description, taken in conjunction with the drawings in which.

LIST OF APPENDICES

Appendix A is a listing of exemplary software, in the form of C++ code, for implementing mask generation in accordance with a preferred embodiment of the present invention.

DETAILED DESCRIPTION

The present invention provides a robust method and system for mask generation based on a chroma key.

For purposes of clarity the present invention is described with respect to the three-dimensional RGB color space, although it is apparent to those skilled in the art that it applies to other color spaces of arbitrary dimensions as well. Similarly, the present invention is described with respect to 8-bit color values, although it is apparent to those skilled in the art that it applies to other color depths as well.

In a preferred embodiment, the present invention generates a mask value, $\alpha$, based on a pixel color $\vec{p}=(r, g, b)$ and a given chroma key $\vec{k}=(k_r, k_g, k_b)$. That is, $\alpha$ is preferably determined as a function $\alpha=\alpha(\vec{p}, \vec{k})$. Correspondingly, mask generation for a digital image $\{\vec{p}_{ij}: 0 \leq i<m, 0 \leq j<n\}$ is performed by generating the mask $\{\alpha_{ij}=\alpha(\vec{p}_{ij}, \vec{k}): 0 \leq i<m, 0 \leq j<n\}$.

Figure 1:
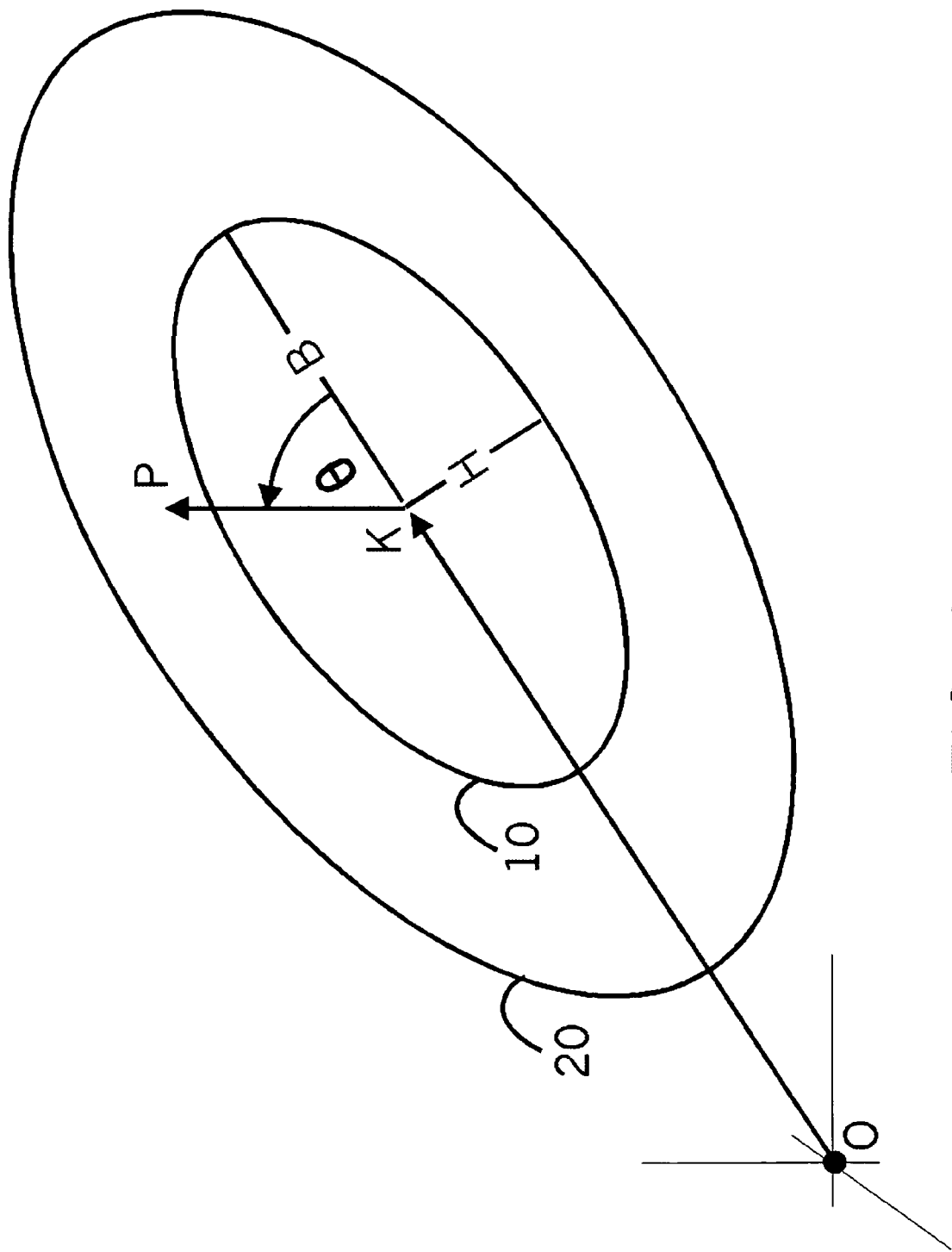
FIG. 1 is an illustration of calculation of a mask value for a pixel color based on a given chroma key, in accordance with a preferred embodiment of the present invention.

Reference is now made to FIG. 1, which illustrates calculation of a mask value for a pixel color based on a given chroma key, in accordance with a preferred embodiment of the present invention.

In a preferred embodiment of the present invention, mask generation is based on a geometry of two concentric ellipsoids of revolution in color space. Specifically, an inner planar ellipse 10 centered about a key color K in three-dimensional color space is rotated about the vector $\vec{OK}$ from the origin to K, to generate an inner ellipsoid of revolution. An outer ellipse 20, co-planar with inner ellipse 10 and also centered about K, and preferably having the same eccentricity as inner ellipse 10, is also rotated about the vector $\vec{OK}$ to generate an outer ellipsoid of revolution.

Preferably, mask values are generated as follows:

1. For pixel colors falling within the inner ellipsoid, the mask value is 0.

2. For pixel color falling outside the outer ellipsoid, the mask value is 255.

3. For pixel values in the ellipsoidal annulus between the inner and outer ellipsoids, the mask value is set to an integer between 0 and 255, based on an interpolation calculation as described herein below.

An advantage of the present invention is the ease with which the mask values can be calculated. The present invention takes advantage of the rotational symmetry of the inner and outer ellipsoids of revolution to reduce the calculations to simple planar vector arithmetic.

Indeed, given a pixel color P in three-dimensional color space, the mask value for P can be determined by considering the planar cross-section with the plane determined by the three points O, K and P. Such a plane is illustrated in FIG. 1. Let b denote the semi-axis length of ellipse 10 along the direction of the vector $\overrightarrow{OK}$, and let h denote the semi-axis length along the orthogonal direction within the plane. Relative to these axes and relative to an origin located at K, the coordinates of P are given by P=(x, y), where x=$\|\overrightarrow{KP}\|$ cos θ, y=$\|\overrightarrow{KP}\|$ sin θ, and θ is the angle between the vectors $\overrightarrow{OK}$ and $\overrightarrow{KP}$. Thus the determination of whether P is inside of ellipse 10, outside of ellipse 20 or between the ellipsi, can be made by calculating the value of $$d = \frac{x^2}{b^2} + \frac{y^2}{h^2} \quad (1)$$

Specifically, for an inner ellipse threshold $T_1$ and an outer ellipse threshold $T_2$, the mask value for P is given by $$\alpha = \begin{cases} 0, & \text{if } d \leq T_1 \\ 255, & \text{if } d \geq T_2 \\ \frac{d-T_1}{T_2-T_1} 255, & \text{if } T_1 < d < T_2 \end{cases} \quad (2)$$

Reference is now made to Appendix A, which is a listing of exemplary software, in the form of C++ code, for implementing mask generation in accordance with a preferred embodiment of the present invention. Described in Appendix A is a method chromaMask_fc( ) from a C++ class AlphaMask. The method chromamask_fc( ) has as input: a digital image specified as an array of RGB values, denoted *pixels; color coordinates of a chroma key, denoted red, green, blue; and ellipse semi-axis lengths (in pixels), denoted brightTol and hueTol. The output of chromamask_fc( ) is a filled-in array of mask values, denoted m_alphamask, which is a member of the class AlphaMask.

As can be seen from the listing in Appendix A, the angle θ is computed through the vector dot-product, $$\cos\theta = \frac{\overrightarrow{OK} \cdot \overrightarrow{KP}}{\|\overrightarrow{OK}\| \cdot \|\overrightarrow{KP}\|}.$$

As can also be seen from the listing in Appendix A, the calculation of d is circumvented if $$\|\overrightarrow{KP}\|^2 < T_1 \min(b^2, h^2),$$

in which case α is set to 0; or if $$\|\overrightarrow{KP}\|^2 > T_2 \max(b^2, h^2),$$

in which case α is set to 255. Geometrically, referring to FIG. 1, the former condition corresponds to P lying in the circle inscribed within ellipse 10 and concentric therewith. Similarly, the latter condition corresponds to P lying outside of the circle circumscribed about ellipse 20 and concentric therewith.

Regarding setting of the semi-axis parameters b and h, it may be appreciated that adjustments along the direction of the vector $\overrightarrow{OK}$ correspond generally to adjustments of chroma key brightness, and adjustments along directions orthogonal to $\overrightarrow{OK}$ correspond generally to adjustments of chroma key hue. It has been found that a ratio of $$\frac{b}{h} \approx 2,$$

corresponding to an eccentricity of $$\frac{\sqrt{3}}{2},$$

yields accurate mask values for backgrounds having low color saturation and high brightness variation.

Figure 2:
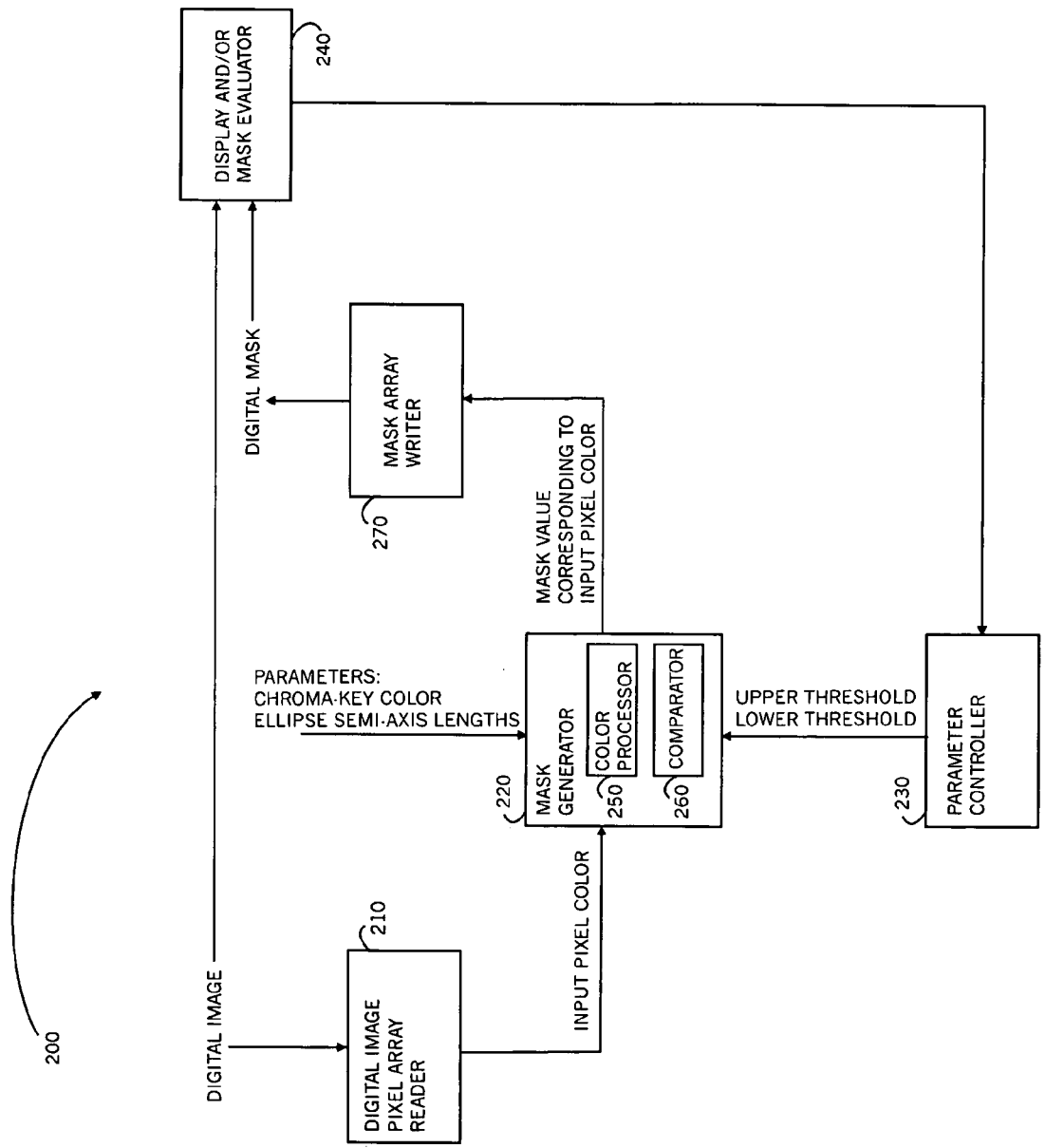
FIG. 2 is a mask generation system operative in accordance with a preferred embodiment of the present invention.

Reference is now made to FIG. 2, which is a mask generation system 200 operative in accordance with a preferred embodiment of the present invention. System 200 serves to derive a digital mask for cutting out a desired subject from a digital image, based on a given chroma key. Shown in FIG. 2 is a pixel array reader 210 that reads individual pixel colors from a digital image and transmits them for processing to a mask generator 220. Mask generator 220 accepts individual pixel colors as input and derives corresponding individual mask values as output. Chroma key color values and elliptical semi-axis lengths are provided to mask generator 220 as parameters.

It may be appreciated by those skilled in the art that ellipse eccentricity may be specified by setting semi-axis lengths, or by setting a major axis to minor axis length ratio, or by setting an eccentricity.

In a preferred embodiment of the present invention, upper and lower thresholds are adjustable by parameter controller 230. Adjusting the upper and lower thresholds serves to fine-tune the mask generation on an image-by image basis. Based on visual results, a user can adjust the thresholds to reduce the opaque portion and/or to enlarge the transparent portion. Shown in FIG. 2 is an optional display 240, through which a user can view a masked digital image resulting from application a derived mask and adjust the thresholds in a feedback loop.

It may be appreciated by those skilled in the art that feedback from a masked digital image to parameter controller 230 may be manual, by a user, or automatic, by a computer, or partially manual and partially automatic. For automatic feedback, display 240 is preferably replaced by or augmented with a mask evaluator that analyzes a mask and a digital image to score the goodness of a specific mask, and to determine how to further adjust the upper and lower thresholds to improve the score.

In a first alternate embodiment of the present invention, upper and lower thresholds are also provided to mask generator 220 as parameters. In a second alternate embodiment of the present invention chroma key color values and/or elliptical semi-axis lengths are also adjusted by parameter controller 230.

Preferably, mask generator 220 derives mask values according to Equation (2) hereinabove. As shown in FIG. 2, preferably mask generator 220 includes a color processor 250 for calculating the value of d, as indicated above in Equation (1) hereinabove, and a comparator 260 for comparing the value of d with the thresholds as indicated in Equation (2) hereinabove. Mask values derived by mask generator 220 are transmitted to a mask array writer 270, for incorporation within a digital mask.

In the foregoing specification the invention has been described with reference to specific exemplary embodiments thereof. It will, however, be evident that various modifications and changes may be made to the specific exemplary embodiments without departing from the broader spirit and scope of the invention as set forth in the appended claims. Accordingly, the specification and drawings are to be regarded in an illustrative rather than a restrictive sense.

APPENDIX A

```
void AlphaMask::chromaMask_fc(unsigned char *pixels, int red, int green, int blue, double brightTol,
                              double hueTol) {
    static const double lowThreshold = 128.0*128.0;
    static const double highThreshold =160.0*160.0;
    unsigned char *pAlpha = m_alphaMask;
    int nPix = m_imageHeight*m_imageWidth;
    int r,g,b;         // pixel colors
    double dotProd;    // Dot Product of key color and pixel color vectors in RGB space.
    double cos2;       // square of cosine of angle between key color and pixel color in RGB space.
    double sin2;       // square of sine of angle between key color and pixel color in RGB space.
    double kvl2;       // key color RGB vector length, squared.
    double dvl2;       // pixel color delta RGB vector length, squared.
    double ellipseRad2;
    double brTol2;
    double huTol2;
    double maxTol2;
    double minTol2;
    brTol2 = .25/(brightTol*brightTol);
    huTol2 = .25/(hueTol*hueTol);
    maxTol2 = (brTol2 > huTol2) ? brTol2 : huTol2;
    minTol2 = (brTol2 > huTol2) ? huTol2 : brTol2;
    double htSphere = highThreshold/minTol2;
    double ltSphere = lowThreshold/maxTol2;
    kvl2 = (double) (red*red + green*green + blue*blue);
    for(;nPix > 0; --nPix, pixels += 3){
        r = pixels[2];
        g = pixels[1];
        b = pixels[0];
        double dR, dG, dB;
        dR = r - red;
        dG = g - green;
        dB = b - blue;
// Slight speed up: [Just calc outer and inner spheres instead of ellipse]
        dvl2 = (double) (dR*dR + dG*dG + dB*dB);
        if(dvl2 > htSphere){
            b = 255;
            *pAlpha = b;
            pAlpha++;
            continue;
        }
        if (dvl2 < ltSphere){
            b = 0;
            *pAlpha = b;
            pAlpha++;
            continue;
        }
// If its between the inner and outer sphere, calculate the ellipse:
        dotProd = dR*red + dG*green + dB*blue;
        cos2 = dotProd *dotProd/(dvl2*kvl2);
        sin2 = 1.0 - cos2;
        ellipseRad2 = dvl2*(brTol2*cos2 + huTol2*sin2);
        int b;
        if(ellipseRad2 < lowThreshold){
            b = 0;
        } else if(ellipseRad2 < highThreshold){
            b = (255*(ellipseRad2 - lowThreshold))/(highThreshold - lowThreshold);
        }else{
            b = 255;
        }
        *pAlpha = b;
        pAlpha++;
    }
}
```

What is claimed is:

1. A method for chroma key masking comprising:
adjusting a first parameter representing a size of a first ellipsoid in a color space, the first ellipsoid being centered about a prescribed chroma key color;
adjusting a second parameter representing a size of a second ellipsoid in the color space, the second ellipsoid being centered about the prescribed chroma key color and surrounding the first ellipsoid in the color space; and
generating a mask value for a given pixel color based on the location of the given pixel color in the color space, relative to the first and second ellipsoids.

2. The method of claim 1 wherein the first and second ellipsoids are ellipsoids of revolution, each having an axis of revolution along a vector representing the prescribed chroma key color.

3. The method of claim 2 wherein cross sections of the first and second ellipsoids have the same eccentricity.

4. The method of claim 3 wherein the eccentricity of cross sections of the first and second ellipsoids is approximately 0.866.

5. The method of claim 1 wherein said generating a mask value assigns a substantially transparent mask value if the given pixel color is located inside the first ellipsoid, assigns a substantially opaque mask value if the given pixel color is located outside the second ellipsoid, and a partially transparent mask value if the given pixel color is located in an annular region between the first ellipsoid and the second ellipsoid.

6. A chroma key masking system comprising:
a parameter controller adjusting first and second parameters representing sizes of a first and a second ellipsoid in a color space, respectively, the first and second ellipsoids being centered about a prescribed chroma key color, and the second ellipsoid surrounding the first ellipsoid in the color space; and
a mask processor for generating a mask value corresponding to a given pixel color based on the location of the given pixel color in the color space, relative to the first and second ellipsoids.

7. The chroma key masking system of claim 6 wherein the first and second ellipsoids are ellipsoids of revolution, each having an axis of revolution along a vector representing the prescribed chroma key color.

8. The chroma key masking system of claim 7 wherein cross sections of the first and second ellipsoids have the same eccentricity.

9. The chroma key masking system of claim 8 wherein the eccentricity of cross sections of the first and second ellipsoids is approximately 0.866.

10. The chroma key masking system of claim 6 wherein said mask processor assigns a substantially transparent mask value if the given pixel color is located inside the first ellipsoid, assigns a substantially opaque mask value if the given pixel color is located outside the second ellipsoid, and a partially transparent mask value if the given pixel color is located in an annular region between the first ellipsoid and the second ellipsoid.

* * * * *